(12) United States Patent
Garratt et al.

(10) Patent No.: US 9,260,200 B1
(45) Date of Patent: Feb. 16, 2016

(54) METAL FATIGUE ANALYTICS AND ALERT SYSTEMS

(71) Applicant: International Business Machines Corporation, Armonk, NY (US)

(72) Inventors: Andrew M. Garratt, Andover (GB); Andrew D. Humphreys, Hampshire (GB); Martin G. Keen, Cary, NC (US); John J. P. McNamara, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/536,063

(22) Filed: Nov. 7, 2014

(51) Int. Cl.
  *B64D 45/00* (2006.01)
  *G07C 5/00* (2006.01)
  (Continued)

(52) U.S. Cl.
  CPC .......... *B64D 45/00* (2013.01); *G06F 17/30572* (2013.01); *G07C 5/006* (2013.01); *G07C 5/008* (2013.01); *G07C 5/0808* (2013.01); *G07C 5/0841* (2013.01); *B64D 2045/0085* (2013.01)

(58) Field of Classification Search
  CPC ........... B64D 45/00; B64D 2045/0085; G07C 5/006; G07C 5/008; G07C 5/0841; G07C 5/0808; G06F 17/30572
  USPC .................... 701/3, 29.1, 31.7, 33.6; 707/776
  See application file for complete search history.

(56) References Cited

U.S. PATENT DOCUMENTS

| | | | | |
|---|---|---|---|---|
| 5,490,195 A | * | 2/1996 | Berkley | B23K 31/12 378/70 |
| 5,625,664 A | * | 4/1997 | Berkley | B23K 31/12 378/72 |
| 6,026,691 A | | 2/2000 | Laird et al. | |

(Continued)

FOREIGN PATENT DOCUMENTS

| | | |
|---|---|---|
| WO | 9840732 | 9/1998 |
| WO | 0131311 A2 | 5/2001 |
| WO | 2011098079 A2 | 8/2011 |

OTHER PUBLICATIONS

Andrzejczak, Chris, "A Study of Factors Contributing to Self-Reported Anomalies in Civil Aviation," Ph.D. diss., University of Central Florida, Florida, 2010, pp. 1-186.

(Continued)

*Primary Examiner* — Russell Frejd
(74) *Attorney, Agent, or Firm* — Douglas A. Lashmit; Hoffman Warnick LLC

(57) ABSTRACT

The disclosure is directed to metal fatigue analytics and alert systems. A system in accordance with an embodiment includes: a first database on a vehicle, the database storing a list of all metal parts in the vehicle and corresponding metal batch information for each of the metal parts; a second database on a server remote from the first database, the second database storing metal batch information for at least one batch of metal from which faulty metal parts have been constructed; a messaging system for polling the second database to obtain the metal batch information for at least one batch of metal from which faulty metal parts have been constructed; a comparing system for comparing the metal batch information stored in the first database with the metal batch information stored in the second database; and the messaging system generating a failure alert message when the comparing system finds a match between the metal batch information stored in the first database and the metal batch information stored in the second database.

20 Claims, 4 Drawing Sheets

(51) Int. Cl.
*G07C 5/08* (2006.01)
*G06F 17/30* (2006.01)

(56) References Cited

U.S. PATENT DOCUMENTS

| | | | | |
|---|---|---|---|---|
| 6,542,937 B1 * | 4/2003 | Kask | ................ | G05B 19/4097 |
| | | | | 700/182 |
| 6,727,690 B2 * | 4/2004 | Soules | ................ | G01N 23/207 |
| | | | | 324/209 |
| 6,745,151 B2 * | 6/2004 | Marko | ................ | G07C 5/0808 |
| | | | | 701/31.4 |
| 7,024,747 B2 * | 4/2006 | Easterbrook | ............ | B23P 9/025 |
| | | | | 29/446 |
| 7,047,786 B2 * | 5/2006 | Easterbrook | .......... | B21C 23/001 |
| | | | | 72/334 |
| 7,131,310 B2 * | 11/2006 | Easterbrook | .......... | B21C 23/001 |
| | | | | 72/334 |
| 8,555,253 B2 | 10/2013 | Shufer et al. | | |
| 8,612,806 B2 | 12/2013 | Rossi | | |
| 2007/0157461 A1 * | 7/2007 | Easterbrook | ............ | B23P 9/025 |
| | | | | 29/783 |
| 2010/0205530 A1 | 8/2010 | Butin et al. | | |
| 2011/0060568 A1 | 3/2011 | Goldfine et al. | | |
| 2013/0166458 A1 | 6/2013 | Wallner et al. | | |

OTHER PUBLICATIONS

Cowell, Jason Michael, "Development of a Practical Fatigue Analysis Methodology for Life Prediction of Rotary-Wing Aircraft Components," 2006, Masters Thesis, North Carolina State University, pp. 1-132.

\* cited by examiner

METAL FATIGUE ANALYTICS AND ALERT SYSTEMS

TECHNICAL FIELD

The present invention relates generally to metal parts, and more particularly, to metal fatigue analytics and alert systems.

RELATED ART

The detection of metal fatigue in a vehicle such as an aircraft is a painstakingly difficult activity. Metal fatigue occurs when a material is subjected to repeated loading and unloading. If the loads are above a certain threshold, microscopic cracks will begin to form at the stress concentrators such as the surface, persistent slip bands (PSBs), and grain interfaces. Eventually a crack will reach a critical size, the crack will propagate suddenly, and the structure will fracture.

The failure to detect the effect of metal fatigue in aircraft may lead to tragedy and loss. This problem is seen throughout the aviation industry, from defense to civil aviation, and is also present in other industries that rely on dependable metals as a raw material.

One current solution to the problem has been to regularly and carefully perform an 'eyeball' check on all aircraft for signs of metal fatigue, such as small cracks and signs of unnatural wear. If a metal part on an aircraft shows signs of fatigue, the batch of metal used in the manufacture of the faulty part and the identity of other aircraft that have parts made from the same batch of metal are determined, if possible. Then, again if possible, the owners/operators of the identified aircraft are contacted and, if necessary, the identified aircraft are recalled for a safety check. Typically, any parts made from the same batch of metal are replaced.

Unfortunately, this is a time consuming, resource hungry, inefficient, and error-prone process. Further, given the long lives of aircraft and the fact they change owners frequently, it can be exceedingly difficult to trace the relevant aircraft and link them with the batch numbers.

SUMMARY

A first aspect of the invention provides a system, comprising: a first database on a vehicle, the first database storing a list of all metal parts in the vehicle and corresponding metal batch information for each of the metal parts; a second database on a server remote from the first database, the second database storing metal batch information for at least one batch of metal from which faulty metal parts have been constructed; a messaging system for polling the second database to obtain the metal batch information for at least one batch of metal from which faulty metal parts have been constructed; a comparing system for comparing the metal batch information stored in the first database with the metal batch information stored in the second database; and the messaging system generating a failure alert message when the comparing system finds a match between the metal batch information stored in the first database and the metal batch information stored in the second database.

A second aspect of the invention provides a method, comprising: storing, in a first database on a vehicle, a list of all metal parts in the vehicle and corresponding metal batch information for each of the metal parts; storing, in a second database on a server remote from the first database, metal batch information for at least one batch of metal from which faulty metal parts have been constructed; polling, using a messaging system, the second database to obtain the metal batch information for at least one batch of metal from which faulty metal parts have been constructed; comparing the metal batch information stored in the first database with the metal batch information stored in the second database; and generating, by the messaging system, a failure alert message when the comparing system finds a match between the metal batch information stored in the first database and the metal batch information stored in the second database.

A third aspect of the invention provides a computer program product comprising program code embodied in at least one computer-readable storage medium, which when executed, enables a computer system to implement a method, the method comprising: storing, in a first database on a vehicle, a list of all metal parts in the vehicle and corresponding metal batch information for each of the metal parts; storing, in a second database on a server remote from the first database, metal batch information for at least one batch of metal from which faulty metal parts have been constructed; polling, using a messaging system, the second database to obtain the metal batch information for at least one batch of metal from which faulty metal parts have been constructed; comparing the metal batch information stored in the first database with the metal batch information stored in the second database; and generating, by the messaging system, a failure alert message when the comparing system finds a match between the metal batch information stored in the first database and the metal batch information stored in the second database.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

The present invention relates generally to metal parts, and more particularly, to metal fatigue analytics and alert systems.

Figure 1:
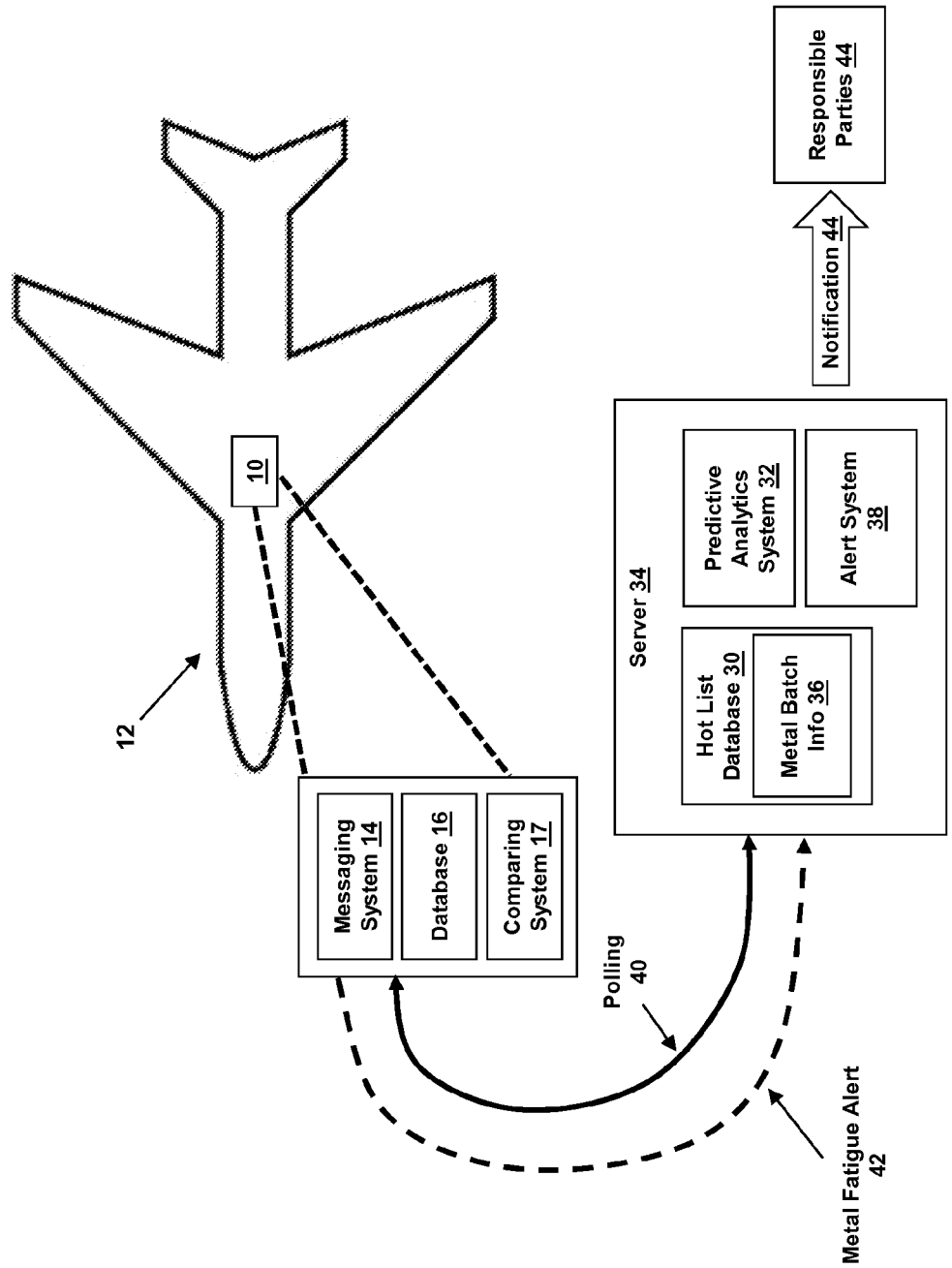
FIG. 1 depicts a metal fatigue analytics and alert system, according to embodiments.

In accordance with embodiments of the present invention, as depicted for example in FIG. 1, a device 10 is installed on a vehicle 12 such as an aircraft. A plurality of vehicles 12 can be provided with the device 10. The device 10 includes a messaging system 14, a metal part database 16, and a comparing system 17. The messaging system 14 may communicate, for example, using a Message Queue Telemetry Transport (MQTT) protocol or any other suitable communication methodology. MQTT is a client/server publish/subscribe messaging protocol, designed for constrained devices and low-bandwidth, high-latency, or unreliable networks. In an embodiment, the device 10 is completely separate from all other systems of a vehicle 12 to allow existing vehicles 12 to be easily retrofitted to include the device 10.

Figure 2:
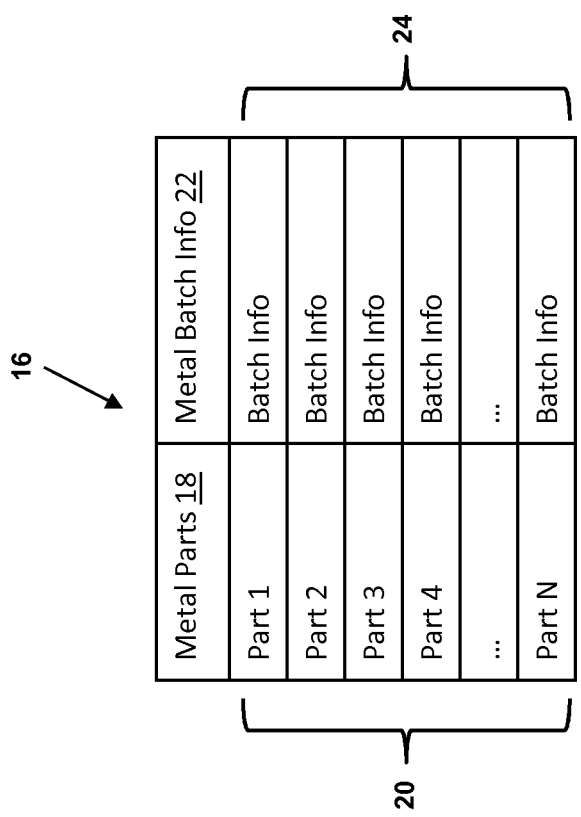
FIG. 2 depicts a database including a list of all metal parts in an aircraft, as well as metal batch information for each of the metal parts in the aircraft, according to embodiments.

As depicted in FIG. 2, the database 16 comprises a list 18 of all of metal parts 20 used in the construction of the vehicle 12, as well as a list 22 of metal batch information 24 for each of the metal parts 20. The metal batch information 22 for each metal part 20 may include information such as the batch number of the metal part 20, manufacturer of the metal part 20, location of manufacture of the metal part 20, metal composition of the metal part 20, specification (e.g., size, weight, etc.) of the metal part 20, condition (e.g., new, used, etc.) of the metal part 20, maintenance records of the metal part 20, and/or the like. The metal parts 20 in the list 18 may be identified by name, part number, and/or the like.

As depicted in FIG. 1, a "hot list" database 30, a predictive analytics system 32, and an alert system 38 are provided on a server system 34. In an embodiment, the server system 34 may comprise, for example, a cloud based server system, such as IBM Cloud. Other types of server systems (e.g., non-cloud, hybrid cloud, etc.) may also be used in the practice of the present invention.

The hot list database 30 stores metal batch information 36 associated with batches of metal from which faulty metal parts (e.g., metal parts that have shown signs of metal fatigue) have been constructed. Such batches of metal are referenced below as 'failed metal batches'. The metal batch information 36 may include, for example, the batch numbers of failed metal batches, manufactures of failed metal batches, location of manufacture of failed metal batches, and/or the like. The metal batch information 36 may also include information identifying known vehicles 12 having metal parts formed from failed metal batches.

The hot list database 30 may be updated to include new metal batch information 36 associated with failed metal batches. For example, if a metal part on a vehicle 12 is determined or suspected to be suffering from metal fatigue (e.g., discovered during routine maintenance, during an inspection, during actual use of the vehicle 12, etc.), new metal batch information 36 identifying the failed metal batch from which the metal part was manufactured may be added to the hot list database 30. The new metal batch information 36 may be stored in the hot list database 30 as soon as it is available to provide real-time updating of the hot list database 30. Periodic (e.g., once an hour, daily, etc.) updating of the hot list database 30 may also be performed.

The messaging system 14 is configured to automatically poll 40 the hot list database 30 on the server system 34 to obtain the metal batch information 36 in the hot list database 30, which is associated with known failed metal batches. The comparing system 17 compares the obtained metal batch information 36 with the metal batch information 22 stored in the database 16 for each metal part on the vehicle 12. The polling 40 may be performed continuously or on a predetermined schedule.

If a match is found via the comparing system 17, thereby indicating that a metal part on the vehicle 12 was formed from a failed metal batch, the messaging system 14 generates and transmits a failure alert message 42 to the server system 34. The messaging system may also transmit the failure alert message 42 directly to the operators of the vehicle 12.

On receipt of a fatigue alert message 42, the alert system 38 notifies 44 a set (one or more) of responsible parties 46 that a potential metal fatigue issue may be present in the vehicle 12. The responsible parties 46 may include, for example, the operators (e.g., pilots), owners, manufacturer(s), and maintenance crews of the vehicle 12. The notification 44 may include, for example, the identity of the vehicle 12, and a list of all metal parts used in the construction of the vehicle 12 that were formed from the failed metal batch. This allows for a preemptive inspection and/or replacement of the metal parts on the vehicle 12 that may be susceptible to metal fatigue. In addition, the notification 44 may be sent to responsible parties associated with other vehicles 12 that may include the same suspect metal part(s). The authorities responsible for vehicle safety (e.g., the FAA and NTSB in the case of an aircraft) may also be notified of a potential metal fatigue issue with one or more metal parts in the vehicle 12.

According to embodiments, as soon as a metal failure problem is discovered and associated with a failed batch of metal, all other potentially affected vehicles 12 (and potentially failure prone metal parts) can be identified and subsequently inspected. This preventative process is proactive and does not rely on a visible identification of a crack, tear, or other metal fatigue damage in a vehicle 12. Affected vehicles 12 can be identified and traced immediately, rather than through a painstaking search. Human error is reduced as eyeball inspections are no longer the primary method to check for metal fatigue of parts in a vehicle 12.

A predictive analytics system 32, such as Smart Cloud Predictive Insights available from IBM, may be used to determine patterns in the sources of batches of metals and associated metal fatigue. This would, for example, allow the operators of an existing vehicle 12 to be aware if the components of their vehicle 12 came from batches of metal manufactured at plants that had a higher than average risk of metal fatigue. These vehicles could then be subjected to additional scrutiny in determining if their metal parts show signs of metal fatigue.

The predictive analytics system 32 may determine patterns in the metal batch information 36 indicating that certain manufactures produce batches of metal that are more prone to metal fatigue than other manufactures or that may not age particularly well. This allows certain metal parts to be highlighted, as a preventative measure, as possibly being more prone to metal fatigue, based on factors such as age, manufacture, location of manufacture, and/or the like. Additional attention, for example, in the form of more frequent inspections or more frequent replacement, may be paid to such metal parts.

Figure 3:
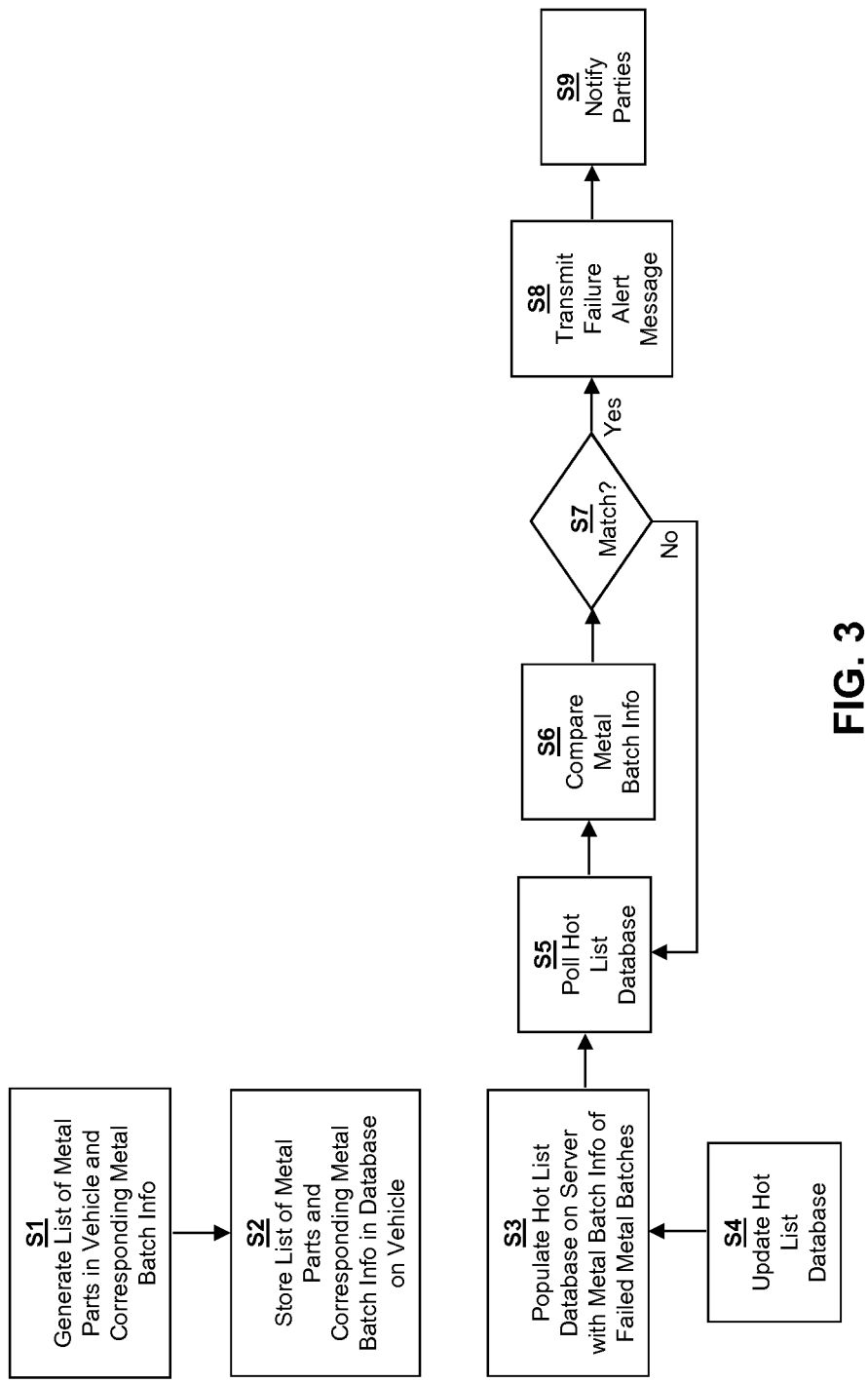
FIG. 3 depicts an illustrative flow diagram of a metal fatigue analytics and alert process, according to embodiments.

FIG. 3 depicts an illustrative flow diagram of a metal fatigue analytics and alert process, according to embodiments. At S1, a list of all of the metal parts used in the construction of a vehicle and corresponding metal batch information for each of the metal parts is generated. At S2, this data is stored in a database on the vehicle. At S3, a hot list database is populated on a cloud based server system with metal batch information associated with batches of metal from which faulty metal parts have been constructed. At S4, the hot list database is updated with new metal batch information corresponding to newly identified failed metal batches.

At S5, a messaging system on the vehicle continuously polls the hot list database to obtain the metal batch information in the hot list database associated with known failed metal batches. At S6, the comparing system compares the obtained metal batch information with the metal batch information for each metal part on the vehicle.

If a match is not found (No, S7), flow passes back to S5. If a match is found (Yes, S7) via the comparing system at S6, thereby indicating that a metal part on the vehicle was formed from a failed metal batch, the messaging system generates and transmits a failure alert message to the server system at S8. The messaging system may also transmit the failure alert message directly to the operators of the vehicle.

On receipt of a fatigue alert message, the alert system notifies a set of responsible parties at S9 that a potential metal fatigue issue may be present in the vehicle. Flow then passes back to S5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 4:
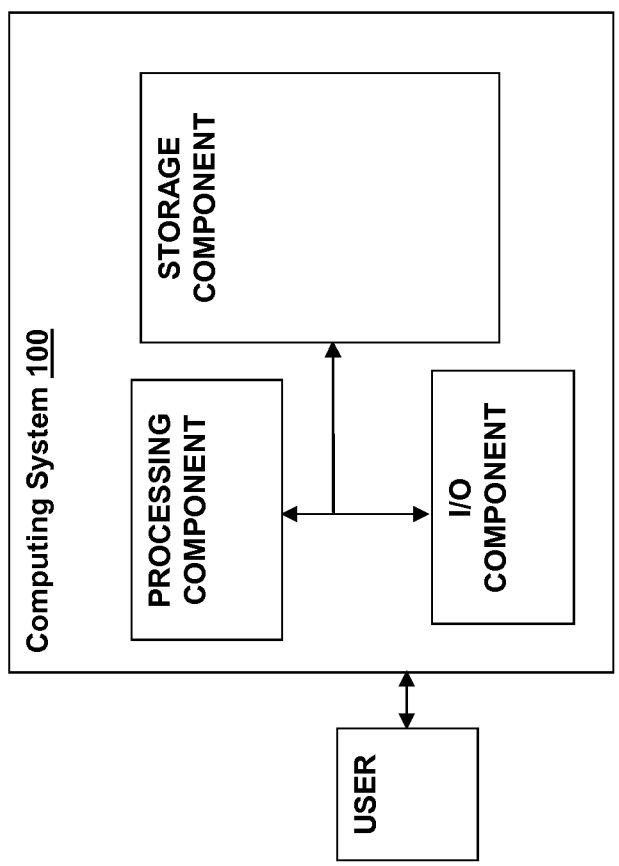
FIG. 4 shows an illustrative computing environment, according to embodiments.

FIG. 4 depicts an illustrative computing system 100 for implementing the present invention, according to embodiments. The computing system 10 may comprise any type of computing device and, and for example includes at least one processor, memory, an input/output (I/O) (e.g., one or more I/O interfaces and/or devices), and a communications pathway. In general, processor(s) execute program code for implementing one or more systems/functions of the present invention, which is at least partially fixed in memory. While executing program code, processor(s) can process data, which can result in reading and/or writing transformed data from/to memory and/or I/O for further processing. The pathway provides a communications link between each of the components in computing system 100. I/O can comprise one or more human I/O devices, which enable a user to interact with computing system 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A system, comprising:
    a first database on a vehicle, the first database storing a list of all metal parts in the vehicle and corresponding metal batch information for each of the metal parts;
    a second database on a server remote from the first database, the second database storing metal batch information for at least one batch of metal from which faulty metal parts have been constructed;
    a messaging system for polling the second database to obtain the metal batch information for at least one batch of metal from which faulty metal parts have been constructed;
    a comparing system for comparing the metal batch information stored in the first database with the metal batch information stored in the second database; and
    the messaging system generating a failure alert message when the comparing system finds a match between the metal batch information stored in the first database and the metal batch information stored in the second database.

2. The system of claim 1, wherein the vehicle comprises an aircraft.

3. The system of claim 1, wherein the faulty metal parts comprise metal parts suffering from metal fatigue.

4. The system of claim 1, wherein the server comprises a cloud-based server.

5. The system of claim 1, further comprising:
    an alert system for notifying, in response to receipt of the failure alert message, a set of parties that a potential metal fatigue issue may be present in the vehicle.

6. The system of claim 1, wherein the messaging system polls the second database continuously or on a predetermined schedule.

7. The system of claim 1, wherein the second database is updated in real time to include new metal batch information for at least one batch of metal from which faulty metal parts have been constructed.

8. The system of claim 1, wherein the messaging system transmits the failure alert message directly to an operator of the vehicle.

9. The system of claim 1, wherein the metal batch information stored in the first database comprises, for each metal part, a batch number of the metal part, a manufacturer of the metal part, and a location of manufacture of the metal part, and wherein the metal batch information stored in the second database comprises, for each faulty metal part, a batch number of the faulty metal part, a manufacturer of the faulty metal part, and a location of manufacture of the faulty metal part.

10. The system of claim 1, further comprising:
    a predictive analytics system for:
        determining patterns in the metal batch information stored in the second database; and
        preemptively identifying metal parts as being susceptible to metal fatigue based on the patterns.

11. A method, comprising:
    storing, in a first database on a vehicle, a list of all metal parts in the vehicle and corresponding metal batch information for each of the metal parts;
    storing, in a second database on a server remote from the first database, metal batch information for at least one batch of metal from which faulty metal parts have been constructed;
    polling, using a messaging system, the second database to obtain the metal batch information for at least one batch of metal from which faulty metal parts have been constructed;
    comparing the metal batch information stored in the first database with the metal batch information stored in the second database; and
    generating, by the messaging system, a failure alert message when the comparing system finds a match between the metal batch information stored in the first database and the metal batch information stored in the second database.

12. The method of claim 11, wherein the vehicle comprises an aircraft.

13. The method of claim 11, wherein the faulty metal parts comprise metal parts suffering from metal fatigue.

14. The method of claim 11, wherein the server comprises a cloud-based server.

15. The method of claim 11, further comprising:
    notifying, in response to receipt of the failure alert message, a set of parties that a potential metal fatigue issue may be present in the vehicle.

16. The method of claim 11, wherein the messaging system polls the second database continuously or on a predetermined schedule.

17. The method of claim 11, wherein the second database is updated in real time to include new metal batch information for at least one batch of metal from which faulty metal parts have been constructed.

18. The method of claim 11, wherein the messaging system transmits the failure alert message directly to an operator of the vehicle.

19. The method of claim 11, wherein the metal batch information stored in the first database comprises, for each metal part, a batch number of the metal part, a manufacturer of the metal part, and a location of manufacture of the metal part, and wherein the metal batch information stored in the second database comprises, for each faulty metal part, a batch number of the faulty metal part, a manufacturer of the faulty metal part, and a location of manufacture of the faulty metal part.

20. The method of claim 11, further comprising:
a predictive analytics system for:
determining patterns in the metal batch information stored in the second database; and
preemptively identifying metal parts as being susceptible to metal fatigue based on the patterns.

\* \* \* \* \*